(12) United States Patent
Kirk (10) Patent No.: US 7,330,916 B1
(45) Date of Patent: Feb. 12, 2008

(54) GRAPHIC CONTROLLER TO MANAGE A MEMORY AND EFFECTIVE SIZE OF FIFO BUFFER AS VIEWED BY CPU CAN BE AS LARGE AS THE MEMORY

(75) Inventor: David B. Kirk, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/454,941

(22) Filed: Dec. 2, 1999

(51) Int. Cl.
*G06F 3/00* (2006.01)
(52) U.S. Cl. .................................. 710/52; 710/305
(58) Field of Classification Search ............ 710/241, 710/52, 57, 29, 305, 59; 370/378; 345/501; 700/108
See application file for complete search history.

(56) References Cited

U.S. PATENT DOCUMENTS

| | | | | |
|---|---|---|---|---|
| 4,991,169 A | * | 2/1991 | Davis et al. ................. | 370/463 |
| 5,751,295 A | * | 5/1998 | Becklund et al. ........... | 345/501 |
| 5,805,905 A | * | 9/1998 | Biswas et al. .............. | 710/241 |
| 6,044,419 A | * | 3/2000 | Hayek et al. ................. | 710/57 |
| 6,138,189 A | * | 10/2000 | Kalkunte ..................... | 370/378 |
| 6,173,381 B1 | * | 1/2001 | Dye ............................ | 345/555 |

\* cited by examiner

*Primary Examiner*—Donald Sparks
*Assistant Examiner*—Harold Kim (57) ABSTRACT

A system for providing a command stream that includes a controller chip is disclosed. The controller chip includes an engine operative to manage a memory. The engine includes an interface. A storage element is coupled to the engine and the storage element is accessible by a central processing unit (CPU) through the engine. The engine receives commands from the CPU via the interface, manages the storage element via the interface and writes the commands into the memory. The engine incorporates the storage element as part of the memory.

19 Claims, 6 Drawing Sheets

GRAPHIC CONTROLLER TO MANAGE A MEMORY AND EFFECTIVE SIZE OF FIFO BUFFER AS VIEWED BY CPU CAN BE AS LARGE AS THE MEMORY

FIELD OF THE INVENTION

The present invention relates generally to a computer system and more particularly to a method and system for efficiently providing a command stream in a computer system.

BACKGROUND OF THE INVENTION

The constant emphasis in the design of computer systems has been to make such systems faster and able to handle larger amounts of information so that they may accomplish more work in less time. The ability of computers to do more work in less time is also enhanced by their ability to do more different kinds of work. For example, computers have become more useful in various applications with the advent of computer graphics displays which allow the presentation of numbers and text with pictures and graphs enhancing the meanings of the numbers and text. It has become the belief of a great number of people in the computer industry that a graphical output should be present on almost all computer systems.

In a typical computer system, a graphics controller sends video signals to monitors and also controls a frame buffer memory system. Data representing, for example, fonts are written into a frame buffer associated with the computer system. The graphics controller typically extracts the characters of the font to scan them onto a computer display or monitor.

A first conventional system for providing for a command stream for rendering data into the frame buffer on system memory requires that the command be downloaded directly from a central processing unit (CPU) via the graphics controller. In such an I/O buffer based system, a storage element, commonly referred to as first in first out (FIFO) buffer, within the graphics controller is utilized to provide the data from the CPU to the graphics engine. There are two problems with this implementation. First, the FIFO buffer can be filled to varying degrees depending upon the relative speeds of the graphics engine and the CPU. If the graphics engine is relatively fast compared to the CPU, then the graphics engine is waiting for data from the CPU. This will adversely affect the overall system performance. If on the other hand the CPU is faster than the graphics engine, the FIFO may become full and then the CPU must either poll the graphics engine or the graphics engine must interrupt the CPU operation periodically. Accordingly, this type of system utilizes a considerable amount of processing power or overhead to perform these tasks.

In a multiprocessing environment, the interrupt is not utilized because there would be no effective way of determining the status of the processors when the interrupt takes place. Accordingly, in a multiprocessing environment, the typical method for utilizing the above-identified system is for the CPU to poll the graphics engine. Therefore, in a typical multiprocessing environment, if the FIFO buffer overflows, the graphics engine will send the command stream to a buffer within the graphics controller. The system will shut down because this is a failure mode. Thereafter, the system is rebooted or restarted based on normal operating conditions.

In a second conventional system, hereinafter referred to as a direct memory access (DMA) buffer system, a CPU accesses the system memory. That system memory in turn can be accessed by the graphics controller. A FIFO buffer is within the system memory which retains the command stream. This command stream can then be obtained by the graphics controller. The advantage of the DMA buffer system over the first conventional system is that the graphics controller polls the system memory asynchronously from the CPU, and since the system memory is larger, there is less chance that the memory FIFO can become full. However, as is also seen, the problem is that if the FIFO buffer is double-buffered, it is divided in half, based on both the CPU and the graphics controller having concurrent access to the FIFO buffer. Accordingly, an inherent problem with the second conventional system is that the size of the system memory buffer is effectively reduced by fifty percent (50%), thereby degrading the overall performance of the system. In addition, there is still significant overhead associated with CPU management of the FIFO buffer. For example, if the FIFO is a circular buffer, the CPU must still ensure that the write pointer does not overrun the read pointer and that the write pointer does not overrun the end of the buffer. In addition, the CPU must also ensure that the FIFO is not full.

Accordingly, what is needed is a system that provides a command stream more efficiently in a computer system. The system must be efficient, easily implemented and a cost-effective alternative to existing systems. The present invention solves such needs.

SUMMARY OF THE INVENTION

A system and method for providing a command stream on a chip or in a computer system is disclosed. The system comprises a central processing unit (CPU), a controller coupled to the CPU and a memory coupled to the controller. The controller manages the memory. The system and method also includes a storage element coupled to the memory, the storage element being accessible by the CPU via the controller.

The system and method in accordance with the present invention allows the controller to receive commands from the CPU and to manage the storage element, typically a first in first out (FIFO) buffer, and incorporates the storage element as part of the memory. In so doing, the system performance is significantly improve by providing a virtual FIFO buffer such that the CPU sees a FIFO buffer with a size equal to the size of the memory. The bandwidth of the bus between the controller and the memory is typically greater than that of the system bus. Hence the performance of the overall system is significantly improved. In addition, since the controller is the only device that has access to the memory, the bandwidth of the bus associated therewith is not divided between two devices. Further, since the controller is managing the storage element, the overhead considerations that related to managing the read and write pointers of the storage element by the CPU are eliminated. Finally, a technique in accordance with the present invention is provided such that the controller determines whether the storage element must be emptied, rather than requiring the CPU to perform this function. Through these features, a command stream can be provided efficiently on a chip or in a computer system.

DETAILED DESCRIPTION

The present invention relates generally to a computer system and more particularly to providing a command stream for rendering data in a computer system in an efficient manner. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

Figure 1:
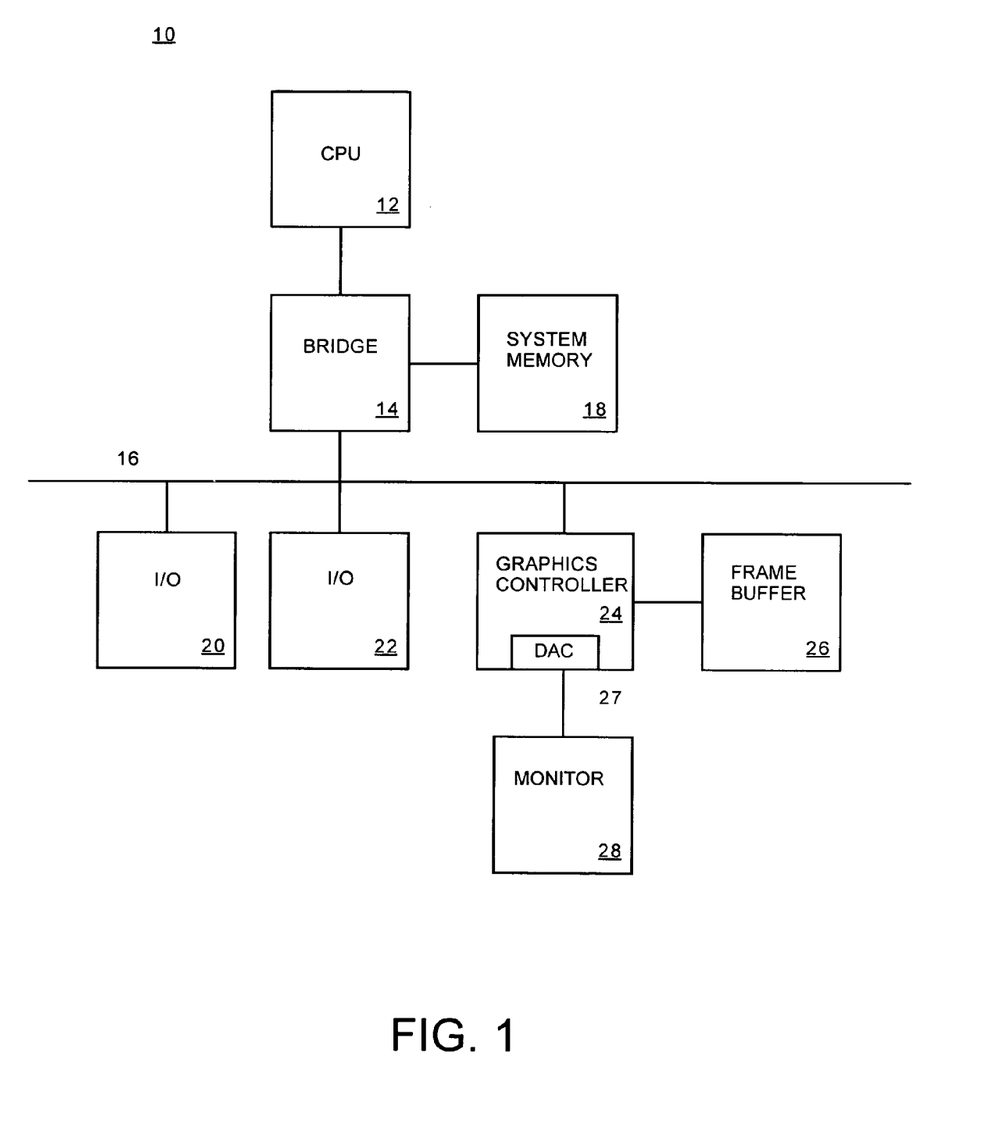
FIG. 1 is a block diagram of a conventional computer system.

FIG. 1 is a block diagram of a conventional computer system. As is seen, the computer system 10 includes a CPU 12. In this embodiment, the CPU is coupled to a bridge 14, which is coupled to a bus 16 and a system memory 18. The bus 16 in a preferred embodiment is an AGP or PCI bus, which allows for signals to be sent thereon to I/O device 20, I/O device 22, graphics controller 24 and frame buffer 26. As is seen, the graphics controller 24 controls a frame buffer 26 and also sends video information (generally RGB) via a digital analog converter (DAC) 27 to a monitor 28.

It should be understood that although the elements of the computer system 10 are shown as discrete components, they can be combined in a variety of fashions and still be within the spirit and scope of the present invention. For example, the bus 16 could be merged into the system, so that there is no actual system bus between the various components, but in fact the various components would communicate directly. In addition, the graphics controller 24, CPU 12, frame buffer 26, system memory 18 and I/O devices 20 and 22 could be integrated in any fashion and that combination would be within the spirit and scope of the present invention.

The following discussion will describe two conventional techniques for providing a command stream into a memory of a computer system. These conventional techniques will be described in the context of data being rendered into the frame buffer. However, one of ordinary skill in the art would readily recognize that the data could be rendered into any memory device within the computer system. For example the system memory could be utilized in this fashion.

Figure 2:
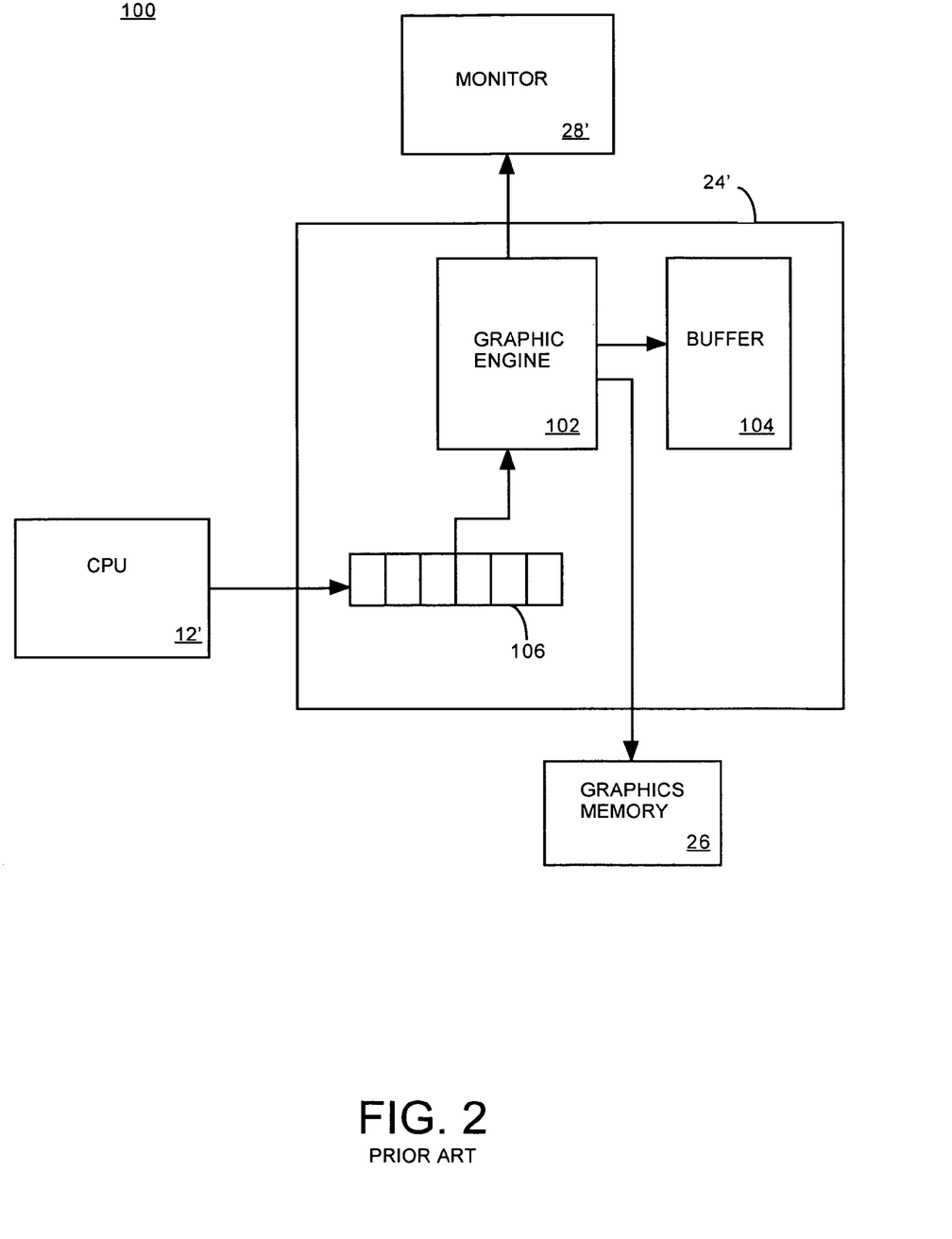
FIG. 2 illustrates a first conventional system for providing a command stream in a computer system.

FIG. 2 illustrates a first conventional system 100 for providing a command stream in a computer system. In this system 100, the CPU 12' directly accesses a FIFO buffer 106 within the graphics controller 24' and the FIFO buffer 106 provides that data to a graphics engine 102. Typically, the FIFO buffer 106 is a circular FIFO buffer. As has also been above-explained, the CPU will have to either poll the graphics engine 102 to ensure that the FIFO buffer 106 is not full, or the graphics engine 102 will interrupt the CPU periodically to ensure that the FIFO buffer 106 is not overflowed. As has been above mentioned, both of these alternatives adversely affect system performance, and more particularly, in multiprocessing environments polling is the only option.

Figure 3:
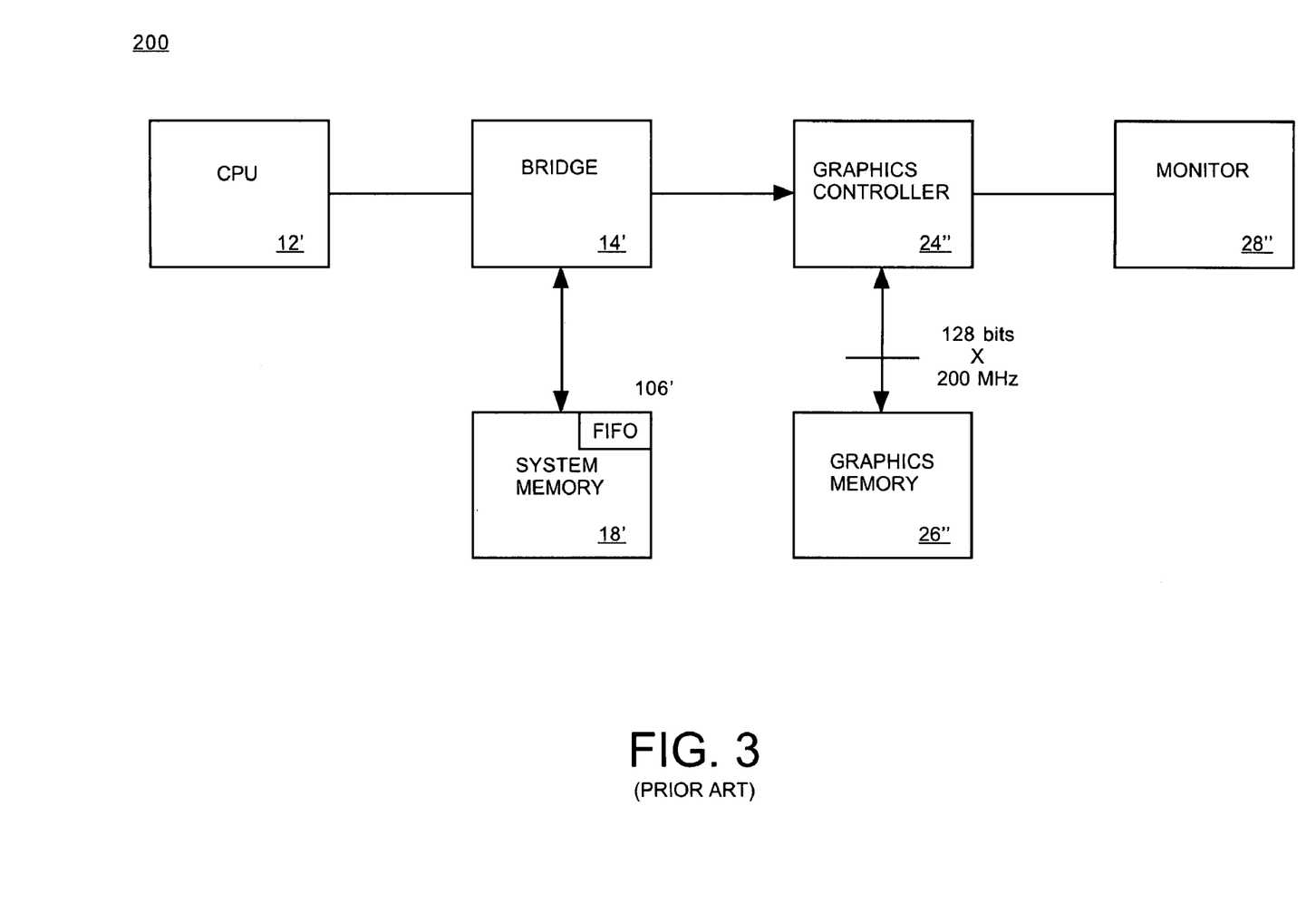
FIG. 3 illustrates a second conventional system for providing a command stream in a computer system.

FIG. 3 illustrates a second conventional system 200 for providing a command stream in a computer system. This system 200 provides some advantages over system 100 of FIG. 2. In this DMA based system, the system memory 18' also includes a circular FIFO buffer 106'. Data is provided to the FIFO buffer 106' by the CPU 12". The graphics controller 24" also accesses the FIFO buffer 106' in system memory 18'. However, one problem with this approach is that the bandwidth of the system memory bus 107 is attenuated because both the graphics controller 24" and the CPU 12" must divide the memory interface 107 between them. This adversely affects the overall performance of the system. In addition, the CPU 12" still has to manage the FIFO buffer 106' via the graphics controller 24" which adds overhead to CPU 12". To describe this problem with more particularity, please refer now to FIG. 3A in conjunction with the accompanying description.

Figure 3A:
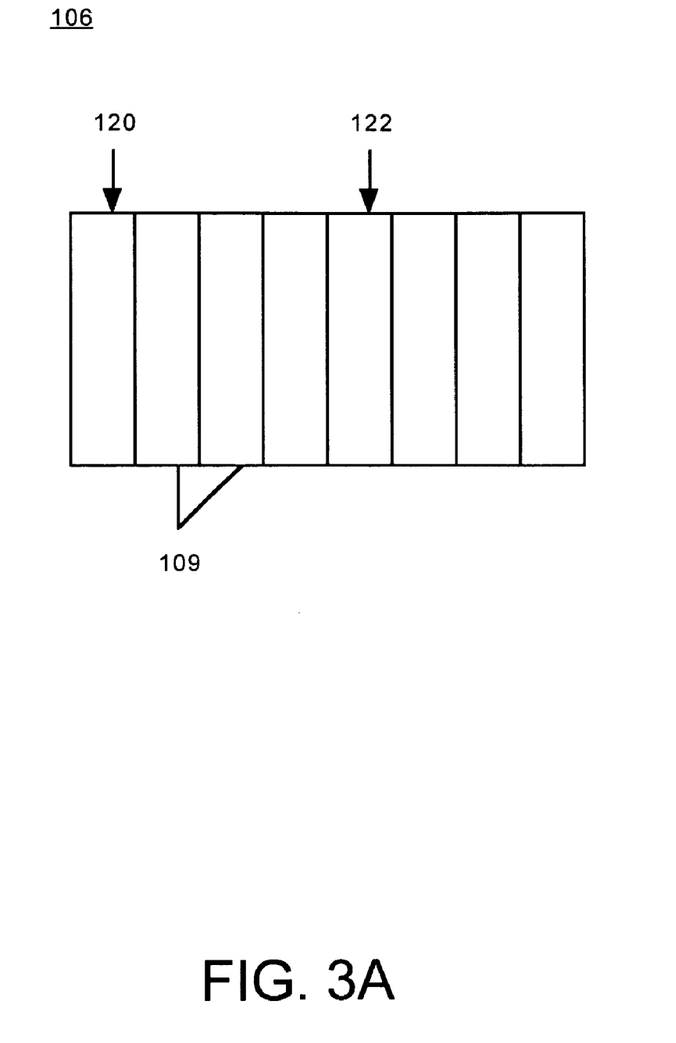
FIG. 3A illustrates an example of a conventional circular FIFO buffer.

FIG. 3A illustrates an example of a conventional circular FIFO buffer 106. The circular FIFO buffer 106 includes a plurality of data slots 109, a read pointer 120 and a write pointer 122. In a preferred embodiment, the FIFO buffer 106 will contain a maximum of 16 words of data. The read pointer 120 indicates where data is being read from and the write pointer 122 indicates where data is being written. The CPU 12" (FIG. 3) must manage the FIFO buffer 106 for two issues. The first issue is that write pointer 122 of FIFO buffer 106 cannot overrun the read pointer 120, and the write pointer 122 can not overrun the end of the FIFO buffer 106. The second issue is that the CPU 12" (FIG. 3) must ensure that the FIFO buffer 106 has not overflowed. It has been determined that almost twenty five percent (25%) of the instructions from a CPU 12" are related to managing the FIFO buffer 106. Accordingly, it requires a significant amount of CPU 12" overhead to manage the FIFO buffer 106.

Accordingly, there are two problems with the second conventional system for providing a command stream in a computer system. First, as shown in FIG. 3, the system memory bus 107 is attenuated because two devices (CPU 12" and the graphics controller 24") use the same system memory bus 107. Second, there is significant overhead associated with the CPU 12" managing the FIFO buffer 106'.

Accordingly, a system and method in accordance with the present invention addresses the above-mentioned problems by causing the graphics controller to manage the FIFO buffer and allowing the FIFO buffer to be part of the graphics memory. In so doing, system performance is significantly improved. First, the performance is improved since the bandwidth of the bus between the graphics engine and the graphics memory is typically greater than that of the system bus. In addition, the graphics engine is the only device that accesses that bus, so the bandwidth is not divided between two devices. Since the graphics engine is managing the FIFO buffer, the overhead considerations that related to managing the read and write pointers of the FIFO buffer by the CPU are eliminated. Finally, a technique in accordance with the present invention is provided to ensure that the CPU is not required to check if the FIFO buffer is full. To more particularly describe the present invention in more detail, refer now to the following description in conjunction with the accompanying figures.

Figure 4:
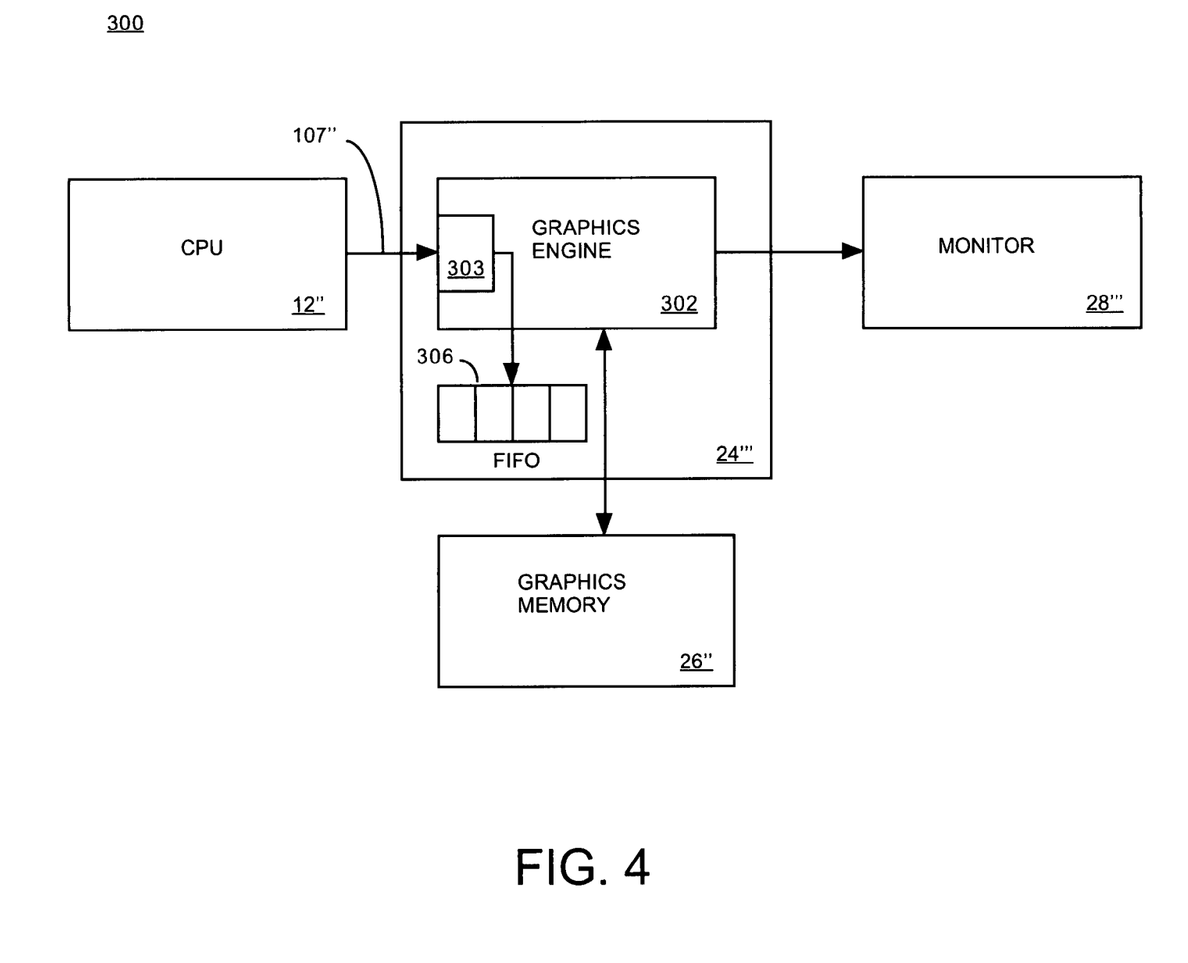
FIG. 4 is a simple block diagram illustrating a system 300 in accordance with the present invention.

FIG. 4 is a block diagram illustrating a system 300 in accordance with the present invention as applied to a graphics system. The graphics engine 302 accepts a command stream through an interface 303 from the CPU 12". The graphics engine 302 in turn can utilize the graphics memory 26" as well as a storage element, such as a FIFO buffer 306, as the buffer for CPU purposes. Accordingly, the effective size of the entire buffer can be virtually the size of the graphics memory 26". Therefore, the CPU 12" will need to check whether the FIFO buffer 306 is full much less frequently than in the above conventional systems since the effective size of the FIFO buffer is much larger. The graphics engine 302 manages the FIFO buffer 306 by checking for the end of the buffer and the buffer wrap around based upon the read and write pointers. This management can be further enhanced by using double and triple buffering techniques to ensure performance is optimal.

Accordingly, from the CPU's point of view, the interface 303 is the storage element. In fact, it is a storage element with a size equal to the size of graphics memory 26". In a preferred embodiment the storage element is a FIFO buffer 306 as shown in FIG. 4 that, when full, is redirected to graphics memory 26". Data is read from the FIFO buffer 306 until empty, then from memory locations in the graphics memory 26", until graphics memory 26" is empty. The filling (writing) and emptying (reading) are asynchronous. Accordingly, the read/write pointers get switched to/from graphics memory 26" and FIFO buffer 306 in an arbitrary manner, however, the overall mechanism provides to CPU 12" the appearance of a FIFO buffer with a size equal to that of the graphics memory 26".

In another embodiment, a larger FIFO buffer can be provided, so that the larger FIFO buffer will rarely overflow and the runout path to graphics memory 26" can be much slower, saving implementation cost.

In yet another embodiment, the FIFO buffer 306 is a large buffer or buffers, part of which is paged out to the graphics memory 26" when it becomes full, and paged back into the FIFO buffer or buffers as needed. Another embodiment provides for double FIFO buffers, in which the graphics engine 302 explicitly manages separate read and write buffers.

In a final embodiment, a triple FIFO buffers are utilized in which the graphics engine 302 explicitly manages separate read and write buffers and also manages an additional buffer that is always free, to avoid deadlock or waiting when switching between the read and write buffers.

Accordingly, the CPU overhead associated with memory management is moved from CPU 12" to graphics engine 302. Typically, there is ten (10) times the bandwidth available on bus 305 as shown in FIG. 4, than on system memory bus 107 as shown on FIG. 3. In addition, since the graphics engine 302 is controlling the FIFO buffer 306, the read and write pointers can be managed thereby and a significant amount of overhead is removed from CPU 12". CPU 12" must still check to determine if FIFO buffer 306 has overflowed. However, since the FIFO buffer 306 is effectively larger, (kilobytes of data compared to sixteen (16) words of data), CPU 12" doesn't have to check nearly as often, thereby further reducing overhead.

Figure 5:
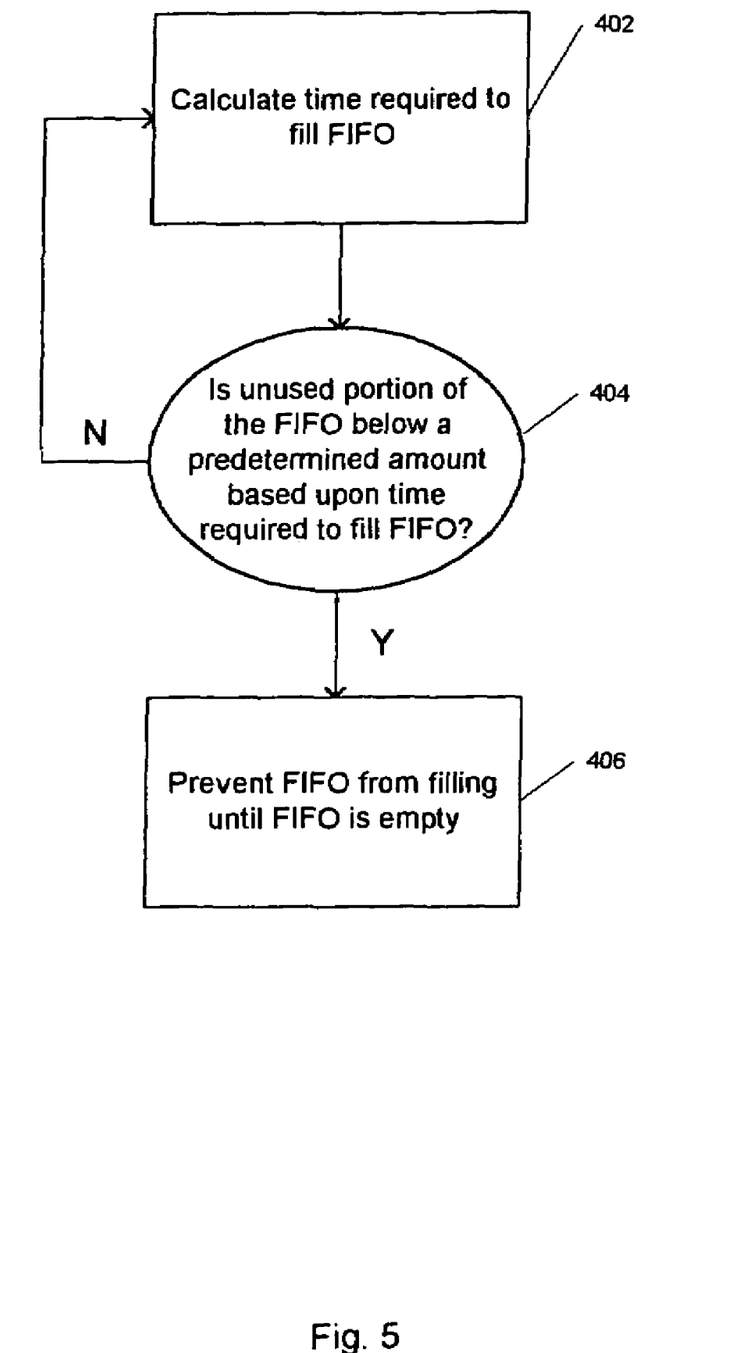
FIG. 5 is a flow chart illustrating a process for eliminating the need for the CPU to determine if the FIFO buffer is full in accordance with the present invention.

It is desirable, however, to eliminate the overhead related to the CPU checking to determine if the FIFO buffer has overflowed. Accordingly, in a preferred embodiment as shown in FIG. 5 there is a flow chart which illustrates a process for eliminating the need for the CPU to determine if the FIFO buffer has overflowed in accordance with the present invention. First, the time required to fill the FIFO buffer is calculated based upon the CPU speed and the size of the FIFO buffer, via step 402. Next, it is determined whether the used portion of the FIFO buffer is more than a predetermined amount based upon the time required to fill the FIFO buffer, via step 404. For example, the predetermined amount could be set at one half (½) of the size of the FIFO buffer. If the used portion is below the predetermined amount, then return to step 402. If the used space is above the predetermined amount, then the FIFO buffer is prevented from filling for a predetermined time period which is calculated so as to empty the FIFO buffer, via step 406. Accordingly, a system and method in accordance with the present invention allows the graphics engine 302 to manage the FIFO buffer 306 and incorporates FIFO buffer 306 as part of graphics controller 24'". In so doing, system performance is significantly improved.

The bandwidth of the bus 305 between graphics engine 302 and the graphics memory 26" as shown on FIG. 4 is typically greater than that of system memory bus 107 as shown on FIG. 3. Hence, the performance of the overall system is significantly improved. In addition, graphics engine 302 of FIG. 4 is the only device that has access to bus 305 as shown on FIG. 4; therefore the bandwidth is not divided between two (2) devices. Further since, as shown in FIG. 4, graphics engine 302 is managing FIFO buffer 306, the overhead considerations related to managing the read and write pointers of the FIFO buffer by the CPU are eliminated. Finally, a technique in accordance with the present invention is provided to ensure that the CPU is not required to check if the FIFO buffer has overflowed. Through these features, a command stream can be provided efficiently in a computer system.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A controller chip comprising:
    a graphics engine operative to manage a memory, the graphics engine comprising an integral interface; and
    a circular first in first out (FIFO) buffer coupled to the graphics engine, the circular FIFO buffer being accessible by a central processing unit (CPU) through the graphics engine, wherein the graphics engine receives commands from the CPU via the integral interface, and manages the circular FIFO buffer via the integral interface and wherein all data transmittable to the circular FIFO buffer is transmitted via the integral interface and the effective size of the FIFO buffer as viewed by the CPU can be as large as the memory.

2. The controller chip of claim 1 in which the circular FIFO buffer comprises a double buffer.

3. The controller chip of claim 1 in which the circular FIFO buffer comprises a triple buffer.

4. The controller chip of claim 1 which includes a checking mechanism for determining if the circular FIFO buffer needs to be emptied without utilizing the CPU.

5. The controller chip of claim 4 wherein the checking mechanism comprises:
    means for calculating the time required to fill the circular FIFO buffer;
    means for determining if the used memory of the circular FIFO buffer, is below a predetermined amount based upon the time required to fill the circular FIFO buffer; and means for preventing the circular FIFO buffer from filling if the used memory in the circular FIFO buffer is over the predetermined amount.

6. The controller chip of claim 1 wherein the controller chip comprises a graphics controller chip.

7. The controller chip of claim 6 wherein the engine comprises a graphics engine.

8. A system for providing a command stream in a computer system comprising:
   a central processing unit (CPU);
   a controller coupled to the CPU and including a graphics engine comprising an integral interface;
   a memory coupled to the controller, the memory being managed by the controller; and
   a circular first in first out (FIFO) buffer coupled to the controller, the circular first in first out (FIFO) buffer being accessible by the CPU through the controller, wherein the controller receives commands from the CPU via the integral interface, manages the storage element via the integral interface and writes the commands into the memory and wherein all data transmittable to the circular FIFO buffer is transmitted via the integral interface and the effective size of the FIFO buffer as viewed by the CPU can be as large as the memory.

9. The system of claim 8 in which the circular FIFO buffer comprises a double buffer.

10. The system of claim 8 in which the circular FIFO buffer comprises a triple buffer.

11. The system of claim 8 in which the controller comprises a graphics controller.

12. The system of claim 8 which includes a checking mechanism for determining if the circular FIFO buffer needs to be emptied without utilizing the CPU.

13. The system of claim 12 wherein the checking mechanism comprises:
   means for calculating the time required to fill the circular FIFO buffer;
   means for determining if the circular FIFO buffer is below a predetermined amount based upon the time required to fill the buffer; and
   means for preventing the circular FIFO buffer from filling if the circular FIFO buffer is above the predetermined amount.

14. A method for providing a command stream in a computer system, the computer system including a central processing unit (CPU), a graphics controller coupled to the CPU, a memory coupled to the graphics controller, the memory being managed by the graphics controller, the method comprising the steps of:
   (a) providing a circular first in first out (FIFO) buffer within the graphics controller; and
   (b) allowing the circular FIFO buffer to be accessible by the CPU via an integral interface of a graphics engine of the graphics controller wherein all data transmittable to the circular FIFO buffer is transmitted via the integral interface and the effective size of the FIFO buffer as viewed by the CPU can be as large as the memory.

15. The method of claim 14 in which the circular FIFO buffer comprises a double buffer.

16. The method of claim 14 in which the circular FIFO buffer comprises a triple buffer.

17. The method of claim 14 in which the memory comprises a graphics memory.

18. The method of claim 14 which includes the step of (c) determining if the circular FIFO buffer needs to be emptied without utilizing the CPU.

19. The method of claim 18 wherein the determining step (c) further comprises:
   (c1) calculating the time required to fill the circular FIFO buffer;
   (c2) determining if the circular FIFO buffer is below a predetermined amount based upon the time required to fill the buffer; and
   (c3) preventing the circular FIFO buffer from filling if the circular FIFO buffer is above the predetermined amount.

* * * * *